United States Patent
Prag

(10) Patent No.: US 11,036,345 B2
(45) Date of Patent: Jun. 15, 2021

(54) SYSTEM AND METHOD FOR ON-SCREEN GRAPHICAL USER INTERFACE ENCAPSULATION AND REPRODUCTION

(71) Applicant: Yuval Prag, San Jose, CA (US)

(72) Inventor: Yuval Prag, San Jose, CA (US)

( * ) Notice: Subject to any disclaimer, the term of this patent is extended or adjusted under 35 U.S.C. 154(b) by 100 days.

(21) Appl. No.: 15/466,551

(22) Filed: Mar. 22, 2017

(65) Prior Publication Data

US 2018/0275835 A1   Sep. 27, 2018

(51) Int. Cl.
*G06F 3/0481*   (2013.01)
*G06F 3/0484*   (2013.01)
*G06F 9/451*    (2018.01)

(52) U.S. Cl.
CPC ........ *G06F 3/0481* (2013.01); *G06F 3/04842* (2013.01); *G06F 3/04845* (2013.01); *G06F 9/452* (2018.02)

(58) Field of Classification Search
CPC .... G06F 3/0482; G06F 3/0488; G06F 3/0481; G06F 3/04842; G06F 3/04845; G06F 9/452

See application file for complete search history.

(56) References Cited

U.S. PATENT DOCUMENTS

| | | | | |
|---|---|---|---|---|
| 5,844,553 A * | 12/1998 | Hao | ......................... | G06F 9/451 715/733 |
| 6,246,411 B1 * | 6/2001 | Strauss | ................. | G06F 3/0486 715/769 |
| 8,910,057 B2 * | 12/2014 | Hornback, Jr. | ........ | G06F 3/1454 715/753 |
| 2003/0221076 A1 * | 11/2003 | Milligan | ............... | G06F 3/0601 711/165 |
| 2006/0036971 A1 * | 2/2006 | Mendel | ................... | G06F 9/451 715/856 |
| 2010/0070842 A1 * | 3/2010 | Aymeloglu | ......... | G06F 17/2288 715/207 |
| 2011/0102336 A1 * | 5/2011 | Seok | .................... | G06F 3/04883 345/173 |
| 2012/0054640 A1 * | 3/2012 | Nancke-Krogh | ..... | G06F 9/4843 715/751 |
| 2012/0166978 A1 * | 6/2012 | Singh | ........................ | G06F 8/38 715/762 |
| 2013/0219307 A1 * | 8/2013 | Raber | ................... | G06F 3/0484 715/763 |
| 2013/0339941 A1 * | 12/2013 | Shelton | ................... | G06F 8/658 717/172 |
| 2016/0034441 A1 * | 2/2016 | Nguyen | ............. | G06F 17/2765 715/234 |
| 2016/0197773 A1 * | 7/2016 | Pandrangi | ........... | H04L 41/0803 709/217 |

(Continued)

*Primary Examiner* — Daniel W Parcher

(57) ABSTRACT

A system and method for capturing and reproducing an on-screen GUI displayed on a display device of a first computer system are described herein. According to one embodiment, a system call is invoked, and a capture area is selected. Based on the content of the capture area, display information and software information is encapsulated in an OS object. The OS object may be packaged into a file and transferred to a remote computer system for reproduction thereon or for reproduction on a second application program of the first computer system. When the content of the OS object is recreated on the remote computer system, a remote user is able to interact with the components of the reproduced on-screen GUI.

19 Claims, 6 Drawing Sheets

(56) References Cited

U.S. PATENT DOCUMENTS

2017/0188213 A1\* 6/2017 Nirantar .................. G06F 9/547
2018/0049029 A1\* 2/2018 Kumar .................. G06F 3/0488
2018/0129657 A1\* 5/2018 Guest .................. G06F 3/04842
2018/0203571 A1\* 7/2018 Dayanandan ............. G06T 7/73

\* cited by examiner

System 112

SYSTEM AND METHOD FOR ON-SCREEN GRAPHICAL USER INTERFACE ENCAPSULATION AND REPRODUCTION

FIELD

Embodiments of the present invention generally relate to the field of computer software. More specifically, embodiments of the present invention relate to systems and methods for enhancing the capabilities of computer operating system software and for advancing user functionality regarding capturing and sharing on-screen content of a graphical user interface.

BACKGROUND

There is a growing need, in the field of computing, to quickly and easily share on-screen multimedia content and collaborate with others. To this end, some productivity and communication applications allow multiple users to view and/or interact with a shared on-screen interface. However, these applications are limited in functionality and cannot be used to share on-screen interfaces of other applications.

Currently, users of computer systems may capture and share on-screen content of a first application program (e.g., capturing a "screenshot") to a second application program. In one example, the user can select an entire display window of the first application, or alternatively, can use a cursor device to selection a portion thereof. Once the region is selected, the user can take a screenshot of the selected portion. As is often the case, the screenshot may include data, text, graphics and one or more user interactive buttons or elements of a graphical user interface. These buttons or elements of the graphical user interface would normally invoke certain functionality when interacted with by a user, with respect to the first application program.

However, when a screenshot, as described above, is captured and is shared with another application program (either on the same computer or on another computer), the screenshot becomes nothing more than a bitmap image of the displayed content of the selected region and the graphical user interface elements therein are no longer interactive and only present a static representation of on-screen content at the capture time. When the screenshot is shared with a second application program, these graphical user interface elements are no longer active, e.g., they do not invoke any functionality when they are selected by a user, e.g., within the second application program.

This reduces the usefulness of sharing the content of the screenshot to another application program or system. What is needed is a technique for sharing on-screen interfaces and functionality of various applications to enable collaboration using a common interface.

SUMMARY

Accordingly, embodiments of the present invention provide a method and system in which a portion of displayed content from a first application program can be selected by a user and then imported into a second, different, application program and displayed thereon. Advantageously, graphical user interface elements of the portion are still functional within the second application program.

More specifically, a system and method for capturing and reproducing an on-screen GUI displayed on a display device of a computer system are described herein. According to one embodiment, a method of encapsulating an on-screen graphical user interface is disclosed. The method includes invoking an OS system call on a computer system to initiate a screen capture, and receiving a first user input and a second user input at the computer system, where an on-screen position of the first user input defines a beginning of a geometric area of the on-screen graphical user interface, and an on-screen position of the second user input defines an end of the geometric area of the on-screen graphical user interface. The geometric area defines a portion of the on-screen graphical user interface to be encapsulated. An object is created in the system memory of the computer system, and the object includes information associated with an application program. A captured portion of the application program is displayed within the portion of the on-screen graphical user interface to be encapsulated, and the information includes software and objects for running the captured portion of the application program. The captured portion may be imported and displayed in another application program and any graphical user interface elements within the captured portion are fully functional within other application programs. In one embodiment, the method further includes packaging the object into a file on a local file system of the computer system and wherein the software and elements comprise: data; images; definition metadata of on-screen elements; positional metadata of on-screen elements; and metadata of functionality of on-screen graphical user interface elements.

According to another embodiment, a method of encapsulating an on-screen graphical user interface and reproducing the on-screen graphical user interface on a remote computer system is disclosed. The method includes initiating a screen capture by invoking an OS system call on a computer system, defining a geometric area of the on-screen graphical user interface using an input device, and creating an OS object for the geometric area of the on-screen graphical user interface. The OS object includes a first sub-object with information for reproducing an on-screen graphical user interface of a first application program and a second sub-object with information for reproducing an on-screen graphical user interface of a second application program, and the on-screen graphical user interface of the first application program and the on-screen graphical user interface of the second application program are displayed within the geometric area of the on-screen graphical user interface. The method further includes transferring the OS object from the computer system to the remote computer system, and opening the OS object on the remote computer system to reproduce the geometric area of the on-screen graphical user interface and to reproduce functionality of the OS object on the remote computer system.

According to yet another embodiment, an apparatus for encapsulating an on-screen graphical user interface and reproducing the on-screen graphical user interface on a remote computer system is disclosed. The apparatus includes a display screen that displays an on-screen graphical user interface, a general purpose processor, and a system memory. The general purpose processor is operable to initiate a screen capture of the on-screen graphical user interface responsive to an OS system call, identify a geometric area of the on-screen graphical user interface, and create an OS object for the geometric area of the on-screen graphical user interface. The OS object includes a first sub-object with information for reproducing an on-screen graphical user interface of a first application program and an on-screen graphical user interface of a second sub-object with information for reproducing a second application program. The on-screen graphical user interface of the first application program and the on-screen graphical user interface of the second application program are displayed within the geometric area of the on-screen graphical user interface. The general purpose processor is further operable to transfer the OS object from the computer system to the remote computer system, where the OS object is opened on the remote computer system to reproduce the geometric area of the on-screen graphical user interface including functionality of the OS object on the remote computer system.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Figure 1:
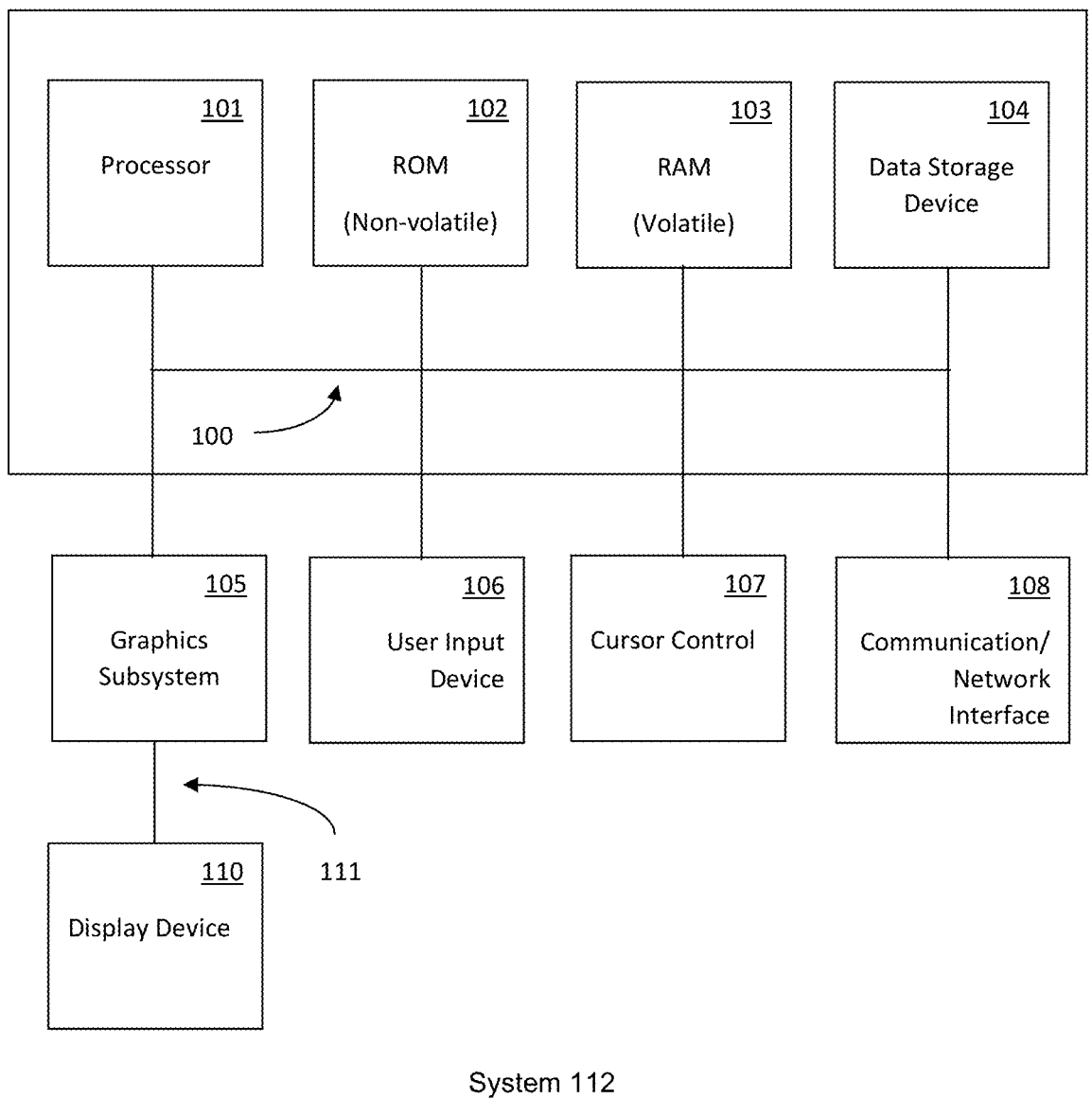
FIG. 1 is a block diagram of an exemplary general computer system which can serve as a platform upon which embodiments of the present invention may be implemented.

Reference will now be made in detail to several embodiments. While the subject matter will be described in conjunction with the alternative embodiments, it will be understood that they are not intended to limit the claimed subject matter to these embodiments. On the contrary, the claimed subject matter is intended to cover alternative, modifications, and equivalents, which may be included within the spirit and scope of the claimed subject matter as defined by the appended claims.

Furthermore, in the following detailed description, numerous specific details are set forth in order to provide a thorough understanding of the claimed subject matter. However, it will be recognized by one skilled in the art that embodiments may be practiced without these specific details or with equivalents thereof. In other instances, well-known methods, procedures, components, and circuits have not been described in detail as not to unnecessarily obscure aspects and features of the subject matter.

Portions of the detailed description that follows are presented and discussed in terms of a method. Although steps and sequencing thereof are disclosed in a figure herein (e.g., FIG. 2 and FIG. 3 for instance) describing the operations of this method, such steps and sequencing are exemplary. Embodiments are well suited to performing various other steps or variations of the steps recited in the flowchart of the figure herein, and in a sequence other than that depicted and described herein.

Some portions of the detailed description are presented in terms of procedures, steps, logic blocks, processing, and other symbolic representations of operations on data bits that can be performed on computer memory. These descriptions and representations are the means used by those skilled in the data processing arts to most effectively convey the substance of their work to others skilled in the art. A procedure, computer-executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical or magnetic signals capable of being stored, transferred, combined, compared, and otherwise manipulated in a computer system. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout, discussions utilizing terms such as "accessing," "writing," "including," "storing," "transmitting," "traversing," "associating," "identifying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Graphical User Interface Capture, Packaging, and Reproduction

Embodiments of the present invention are drawn to a system and method for capturing and reproducing an on-screen graphical user interface (GUI) displayed on a display device of a computer system. A system call is invoked, and a capture area is selected with respect to content displayed within respect to an application program. Based on the content of the capture area, display information and software information is automatically encapsulated in an OS object. The OS object may encapsulate data and one or more graphical user interface elements that provide defined functionality. The OS object may be packaged into a file and transferred to a remote computer system for reproduction and/or imported to another application program on the same computer. When the content of the OS object is recreated on the remote computer system, or the other application of the same computer system, a user is able to interact with the components of the reproduced on-screen GUI, and specifically, the functionality of the GUI elements are advantageously made available to the user as pertaining to the transferred OS object.

Embodiments of the present invention are drawn to exemplary computing devices generally having a network interface component and a display device. The following discussion describes one such exemplary computing device.

In the example of FIG. 1, the exemplary computer system 112 (e.g., a personal computer or a mobile computing device) is a platform on which embodiments of the present invention may operate and includes a central processing unit (CPU) 101 for running software applications and optionally an operating system. Read-only memory 102 and random access memory 103 store applications and data for use by the CPU 101. Data storage device 104 provides non-volatile storage for applications and data and may include fixed disk drives, removable disk drives, flash memory devices, and CD-ROM, DVD-ROM or other optical storage devices. The optional user inputs 106 and 107 comprise devices that communicate inputs from one or more users to the computer system 112 (e.g., mice, joysticks, cameras, keyboards, touch screens, and/or microphones).

A communication or network interface 108 allows the computer system 112 to communicate with other computer systems, networks, or devices via an electronic communications network, including wired and/or wireless communication and including an Intranet or the Internet. The display device 110 may be any device capable of displaying visual information in response to a signal from the computer system 112 and may include a flat panel touch sensitive display. The display device 110 may display renderings of an application program wherein the renderings may include data and graphical user interface elements. A user may interact with cursor directing devices and/or touch sensitive displays to define a portion of the information displayed by an application program on the display 110. This selected portion may be captured and encapsulated, in accordance with the descriptions herein for sharing with other applications of the same computer system 112 and/or remote computer systems. In accordance with embodiments of the present invention, the shared encapsulated portion may be displayed with the graphical user elements providing their customary functionality when selected by a user. The components of the computer system 112, including the CPU 101, memory 102/103, data storage 104, user input devices 106/107, and the display device 110, may be coupled via one or more data buses 100.

In the embodiment of FIG. 1, an optional graphics subsystem 105 may be coupled with the data bus 100 and the components of the computer system 112. The graphics sub-system 105 may comprise a physical graphics processing unit (GPU) and graphics memory. The GPU generates pixel data from rendering commands to create output images. The physical GPU can be configured as multiple virtual GPUs that may be used in parallel (e.g., concurrently) by a number of applications or processes executing in parallel.

Some embodiments may be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Figure 2:
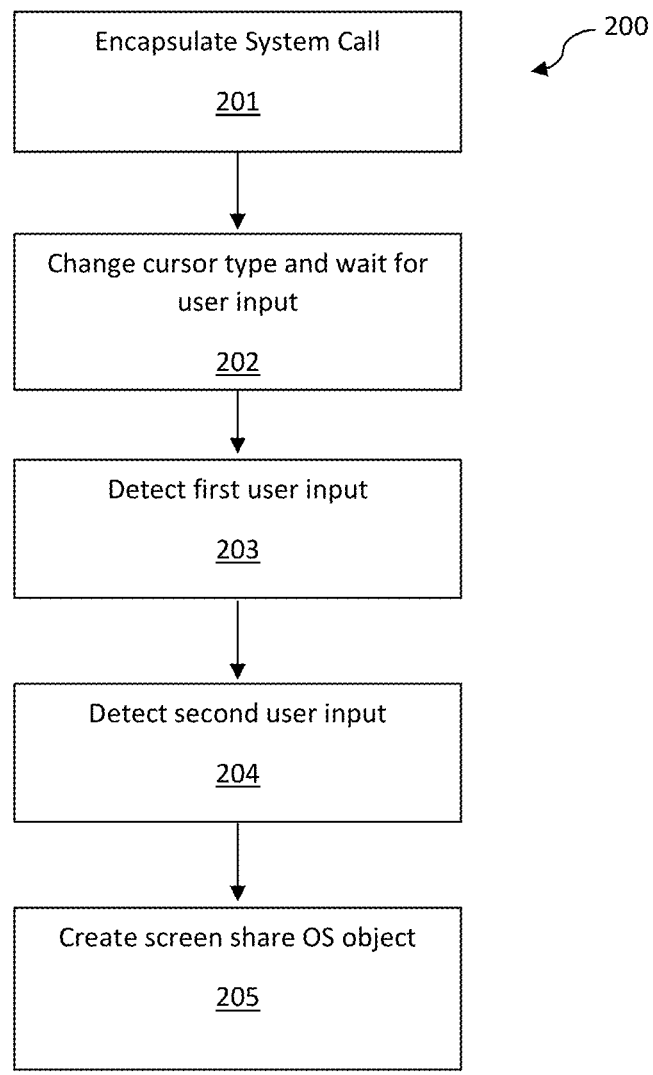
FIG. 2 is a flowchart depicting an exemplary sequence of computer-implemented steps for creating an OS object capable of reproducing an on-screen graphical user interface according to embodiments of the present invention.

With regard to FIG. 2, a flowchart depicting an exemplary sequence of computer-implemented steps 200 for creating an OS object capable of reproducing an on-screen user interface or a component of an on-screen user interface is depicted according to embodiments of the present invention. In accordance with embodiments, the on-screen interface can be shared between applications or computer systems with its graphical user interface elements having their normal functionality where appropriate. At step 201, it is assumed that a first application is operating and rendering a display within a display window that is displayed on a display screen. The display, or "on screen interface" may include data, graphic images and GUI elements that have defined functionality. At step 201, an operating system (OS) level encapsulate system call is made indicating that an area of the on-screen interface is to be captured and encapsulated in an OS object. The system call may be invoked using a hardware request, such as a mouse click, a single or multi-finger gesture (e.g., a three-finger swipe or single-finger tap), or a hotkey, for example, to invoke the encapsulation functionality. The OS object is managed and controlled by the OS, and is given a unique name within the OS. The OS object is made available as part of the operating system application APIs for use by other applications.

At step 202, a cursor of the user interface may be changed to indicate that the computer system is waiting for a user input. The computer system waits to receive a user input indicating a capture area for the encapsulate system call. At step 203, a first user input for selecting an area of the on-screen graphical user interface (GUI) is detected. The first user input after the encapsulate system call indicates that the user has begun selecting an area of the on-screen GUI to be captured and encapsulated. In one embodiment, the selected area is rectangular in shape. At step 204, a second user input is detected. The second user input after the encapsulation system call indicates that the user has completed selecting an area of the on-screen GUI to be captured and encapsulated. An area of the on-screen GUI selected by the user based on the first user input and the second user input may be referred to as a "capture area".

At step 205, the capture area is captured and encapsulated to create a kernel/OS object. The object contains information regarding displayed objects of the capture area. For example, displayed objects captured by the system call may include GUI components (e.g., menus, title bars, sliders, buttons, etc.), text, images, animation, videos, and the like. For example, the OS object may include OS information, application information, and user software information. The information captured may be transferred to another application program of the same computer system or another computer system where the captured area can be recreated. The recreated objects at the destination may generally be used in the same way as the original objects. For instance, if the capture information includes graphical user interface elements with defined functionality, then at the destination, these GUI elements would provide the same functionality when selected by the user. When the capture area includes the GUI of more than one application, a separate sub-object may be created for each application.

Exemplary pseudocode for selecting a capture area and creating a new OS object is depicted in Table I according to embodiments of the present invention.

TABLE I

```
Screen_share_capsule(a: Area)
begin
    change cursor type to (new_type_x)
    while (not_mouse_rgt_click)
        follow the cursor;
    end while
    start_area_selection_process( )
    while (not_mouse_rgt_click)
        follow the cursor
        select the desired are on the screen
    end while
    creat_image(Area)
    encapsulate( )
        Object Screen_Share{
        parse_area_info(crate sub-objects for each user program) }
End
```

According to some embodiments, the kernel/OS object comprises a new OS class that inherits properties from the software being captured, and the kernel/OS object encapsulates and links several objects (e.g., sub-objects) together.

The encapsulated OS object containing the captured on-screen GUI information may include several distinct components. For example, the OS object may include:
- visual information that describes an appearance of the capture area (e.g., a bitmap) or information for rendering the on-screen capture area;
- a sub-object (referred to as a "section") for each user program in the capture area that contains information describing the user application;
- a localization flag used to indicate that a captured object is to remain on the capturing computer system and not be transferred to a remote computer system;
- methods and functions associated with an object (in some cases this may pertain to a GUI element), such as a function for calling or activating a section, a method for saving section information, a method for extracting a section (e.g., opening an object in a native window of the same application program), or re-saving an object to a new file or object, for example.

Exemplary pseudocode for encapsulating an on-screen object of an application program is depicted in Table II according to embodiments of the present invention.

TABLE II

```
bool MakeScreenShareCapsule(
    SysScreenShareCapsuleObject{
        Bitmap capsule GrabDisplay,
        int capsuleCount,
        int NumOfSections,
        int UserProgPointers[NumOfSections],
        struct capsuleHashTable{ },
        File capsuleName
});
```

Once encapsulated in an OS object, the captured GUI portion (referred to as a "screen segment") may be transferred using a transfer function (e.g., a copy-and-paste function), a communication protocol or application, such as email, SMS, or instant messenger, or a shared drive, such as a shared local network drive or cloud storage folder (e.g., Google Drive, Dropbox, or iCloud), or any other well known method of transferring information between applications of the same computer system or between different computer systems. For example, the user may invoke a system call and select a capture area including a streaming video in a browser application to "copy" the selected area as described in FIG. 2. The user may "paste" the captured area into a text editor application, a presentation/slideshow editor, or a spreadsheet editor, for example, using a gesture or keystroke. The user may transfer the captured area by pasting the OS object into an email and sending the email to a remote user, for example. The remote user may open the OS object contained in the email to reproduce the captured area on an on-screen GUI of the remote user's computer system (the "reproducing computer system"). The OS object may be placed in a shared drive or remotely accessible folder, and multiple users may access and edit the OS object simultaneously. Advantageously, in accordance with embodiments of the present invention, the GUI components reproduced are interactive and generally perform the same functions as the original GUI components displayed on the GUI of the user's computer system (the "capturing computer system").

When the OS object is opened on a remote computer system, or on the same computer system using a different application than originally created the capture area, the underlying software is invoked by a system call and runs in a user or kernel space with 'superuser' privileges (e.g., administrator or top-level privileges) to access any requisite information from memory. It is expected that the computer system reproducing captured GUI components already has the requisite application installed and ready to use. For example, if a captured screen segment includes components of Microsoft Word, it is expected that Microsoft Word is installed on or otherwise available to the computer system used to reproduce the captured GUI components, e.g., the destination computer system.

According to some embodiments, if an application required to fully reproduce a captured GUI component is not installed on or available to the destination system, the user is prompted to install the application before the captured GUI component is reproduced. According to some embodiments, when a shared captured region is requested at the destination computer system, a link to the required application is can be provided when an application required to fully reproduce a captured GUI component is not installed on the destination system. According to other embodiments, the required software can be automatically downloaded and installed on the destination computer system when an application required to fully reproduce a captured GUI component is not already installed on the system but the shared captured region is requested for use.

Figure 3:
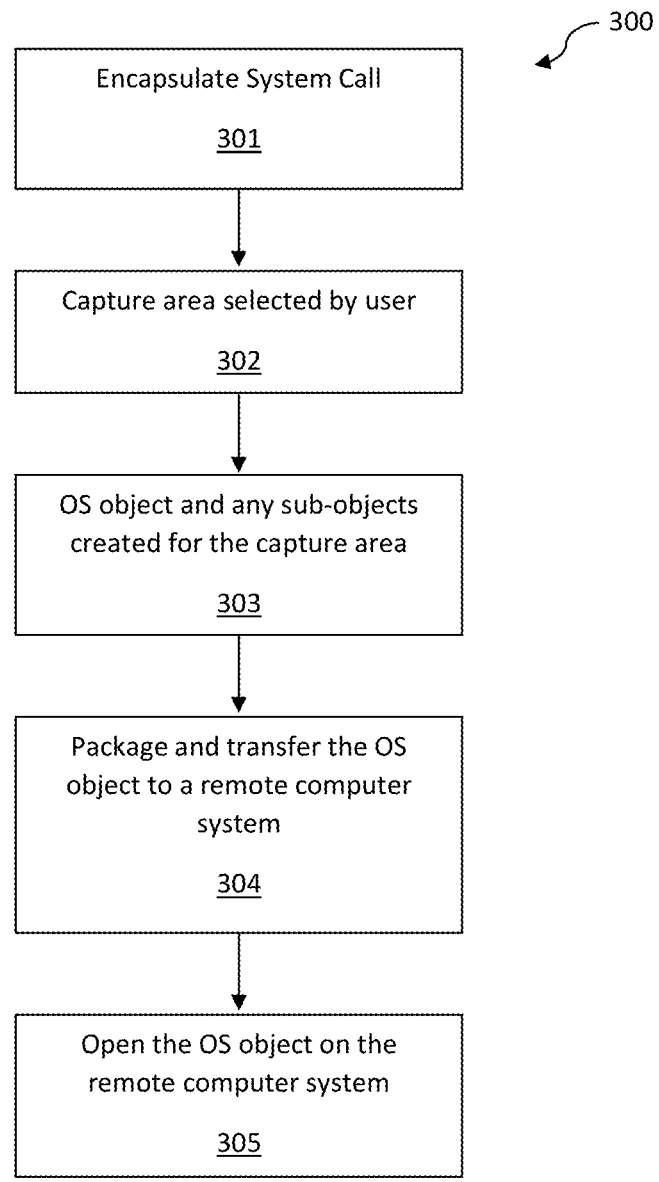
FIG. 3 is a flowchart depicting an exemplary sequence of computer-implemented steps for capturing, packaging, and reproducing an on-screen graphical user interface according to embodiments of the present invention.

With regard to FIG. 3, a flowchart depicting an exemplary sequence of computer-implemented process 300 for capturing, packaging, and reproducing an interactive screen segment is depicted according to embodiments of the present invention. At step 301, an OS system call for initiating a screen capture and encapsulation is invoked. The cursor of the on-screen GUI may be changed, or its display attributes may be altered, to indicate to the user that a screen capture process has been initiated, and that the system is waiting for the user to select a capture area. At step 302, a capture area is selected by a user using an input device, such as a mouse, a keyboard, or a touchscreen display, to select an on-screen geometric area for capture. In one embodiment, the capture area is rectangular in shape.

After the capture area has been defined, at step 303, the operating system creates a new OS object including sub-objects for each application program displayed in the capture area. In this case, the capture area can include windows or window segments that are associated with multiple application programs. The sub-objects may include rendering information for the captured application programs, for example. At step 304, the OS object is packaged so that the captured area can be reproduced using a system pointer to the system memory locations holding the information, for example. If the OS object is saved as part of a file on a local file system, or when the OS object is to be sent from the capturing computer system to a remote computer system, the information required by the OS object will be repackaged as a new file so that any platform can identify what is contained in the object, and how to unfold/extract the information. The file may also include an icon or thumbnail that resembles the screen capture area to represent the file on the operating system.

At step 305, the OS object is opened or extracted at a remote computer system ("destination computer system") or using a different application program of the same computer system. According to some embodiments, step 305 includes reading an "unfold" flag of the OS object to determine if the encapsulated object is to be extracted. If the unfold flag is set, the remote OS calls the system-call used to encapsulate the object, and the unfold flag indicates that the encapsulated object is to be opened, and that the associated GUI is to be reproduced on the display. The remote OS renders all necessary images and calls each user application required by the sub-objects.

In general, the OS invokes the underlying software necessary to allow the user program to become alive/active in the area as it was captured. For example, if the captured area contains a text editor application, the underlying software for the text editor application will be called to display the text editor in the same relative area as displayed on the capturing computer system, and the remote user can use the text editor to edit a text file included in the OS object. In this example, and GUI elements that were captured would provide the same text editing related functionality as within the original display region before the capture. If the necessary software is not available to the reproducing computer system, a message will be displayed indicating that the necessary software is unavailable. According to some embodiments, a link to a web site (e.g., an app store) can be displayed so that the user can easily obtain the necessary software. According to other embodiments, the destination computer system automatically downloads and/or installs the necessary software when the software is not already installed on the reproducing computer system.

According to some embodiments, when opened, the OS object will initially display rendering information in the form of a static image that visually represents the captured GUI components. The user may then click on or otherwise activate an area of the picture that represents a particular application program to interact with the application program.

Figure 4A:
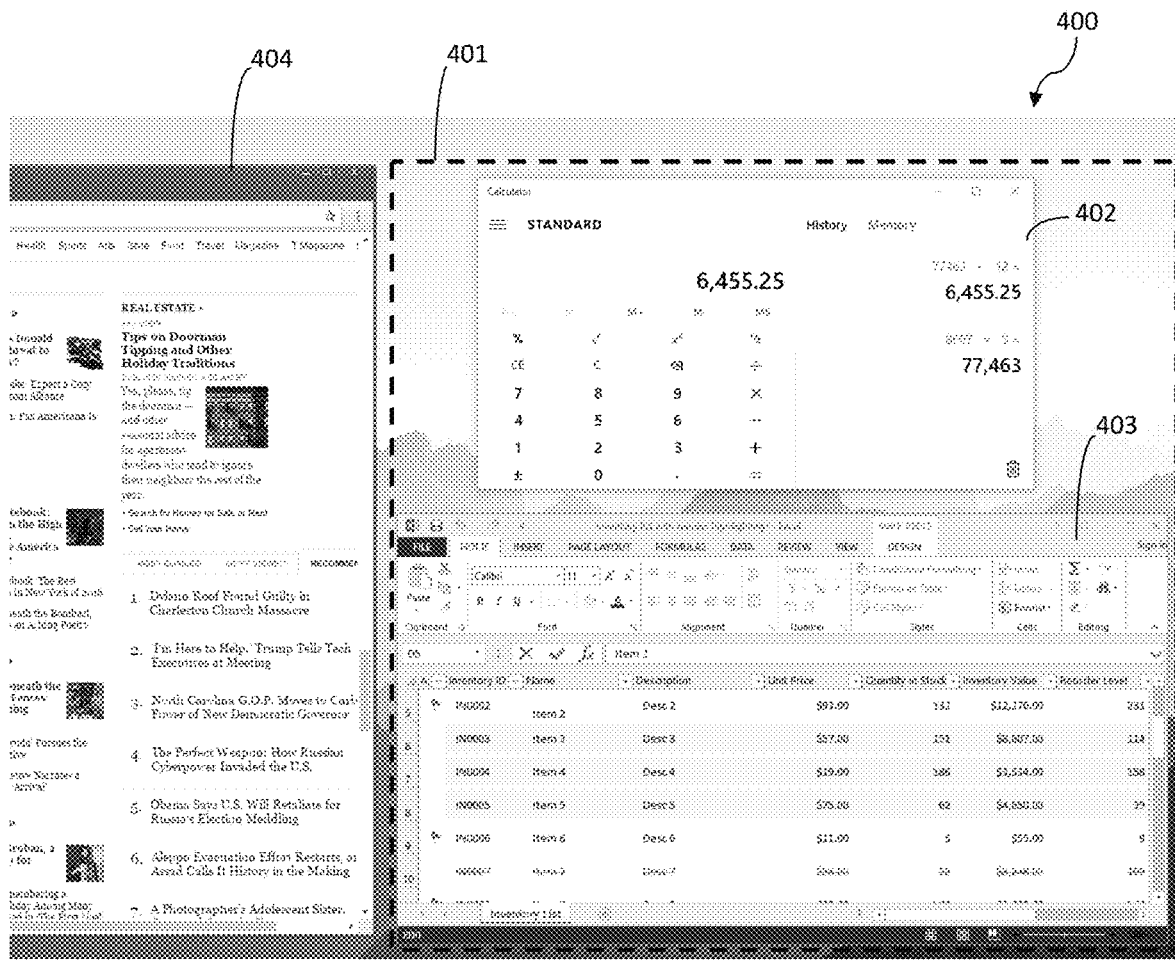
FIG. 4A is a diagram depicting an exemplary on-screen graphical user interface and an exemplary capture area according to embodiments of the present invention.

With regard to FIG. 4A, an on-screen display 400 of an exemplary computer system (e.g., a capturing computer system) is depicted according to embodiments of the present invention. On-screen display 400 renders an on-screen GUI 402 of a calculator application program, an on-screen GUI 403 of a spreadsheet application program, and an on-screen GUI 404 of a browser application program. Screen capture area 401 is used defined in accordance with the techniques described herein and includes the on-screen GUI 402 of the calculator application program, and the on-screen GUI 403 of the spreadsheet application program. A user can define region 401 by interfacing with a cursor directing device, for instance, and invoking the capture command (e.g., the encapsulate system call).

Responsive to an encapsulate system call, and based on the application programs displayed in the screen capture area 401, a new OS object is automatically created that includes rendering information for on-screen GUIs 402 and 403. This rendering information may include definitions of each object and data item within the capture area 401 and other metadata required to implement any GUI element functionality that may be part of the objects of the capture area 401. On-screen GUI 404 of a web browser application program is displayed outside of the screen capture area 401 and therefore will not be included in the OS object. The OS object is then packaged (e.g., stored in a file) and may be transmitted to a remote computer system, using email, for example, or stored locally for use by another application program of the same computer system.

Figure 4B:
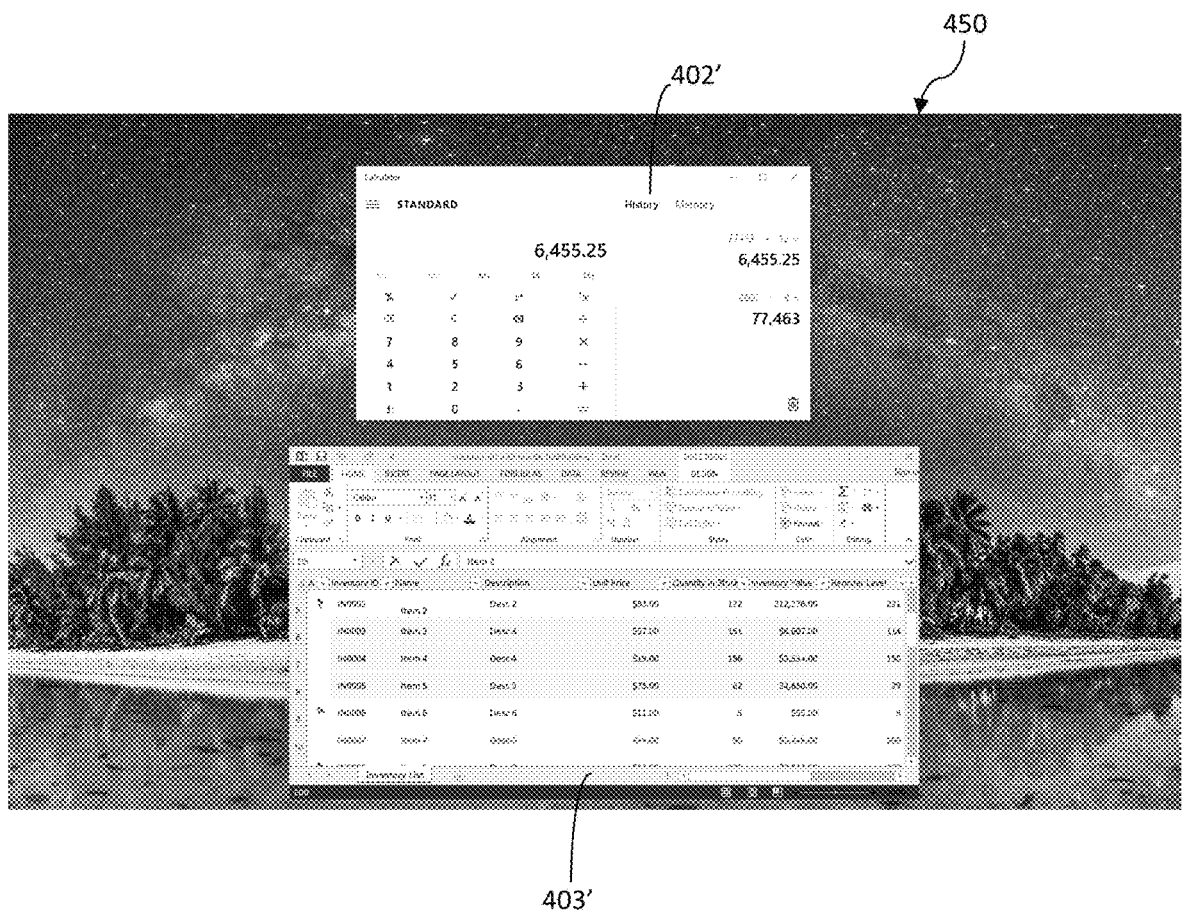
FIG. 4B, is a diagram depicting an exemplary on-screen graphical user interface captured and reproduced on a remote computer system according to embodiments of the present invention.

With regard to FIG. 4B, an on-screen display 450 of an exemplary computer system (e.g., a reproducing computer system) is depicted according to embodiments of the present invention. An OS object containing rendering information for on-screen GUIs 401 and 402 is received by a computer system (e.g., a remote computer system), and on-screen GUIs 402' and 403', based on on-screen GUIs 402 and 403, respectively, are fully reproduced on on-screen display 450 of the remote computer system. In this example, assume a communication mechanism linking the original computer system of FIG. 4A and the destination computer system of FIG. 4B is used to transfer the OS object. For instance, email, the Internet, a file transfer, etc., is used to transfer the OS object. Any well known method of transferring data between computer systems can be used. The reproducing computer system user may advantageously interact with the active elements and data of the GUIs 402' and 403', or extract information outside of the OS object to use in a separate instance of the application programs. If the user chooses to work within the object without extracting the information, the information will remain inside of the packaged file holding and representing the object to the OS.

Figure 5:
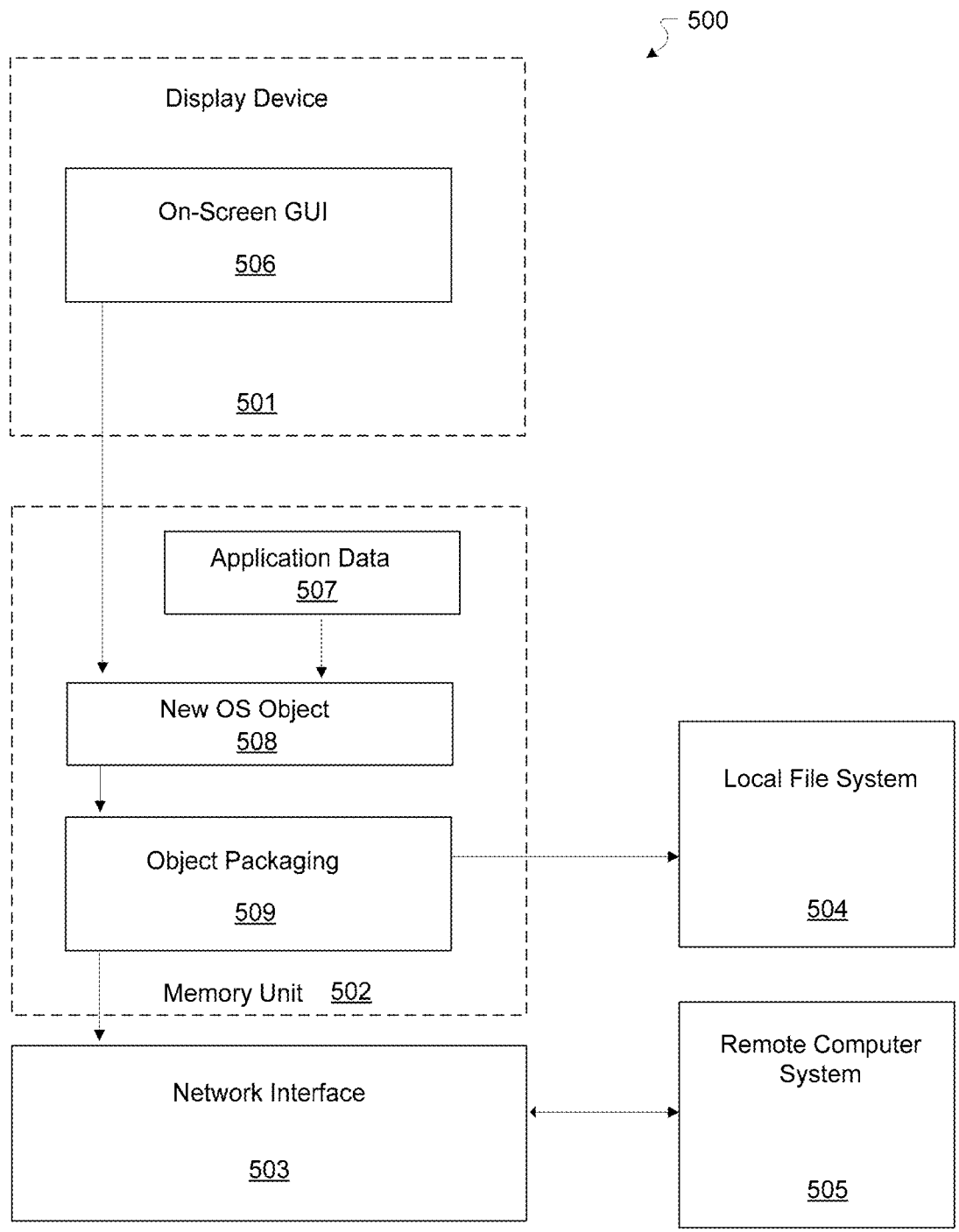
FIG. 5 is a block diagram and data flow depicting an exemplary computer implemented system according to embodiments of the present invention.

In the exemplary embodiment of FIG. 5, exemplary computer implemented system 500 includes a display device 501, a memory unit 502, a network interface 503, and a local file system 504. The computer implemented system 500 can communicate with a remote computer system 505 using network interface 503. Display device 501 displays an on-screen GUI 506. On-screen GUI 506 may include data, images, etc., and active elements of on-screen GUIs of an operating system and GUIs of active application programs, for example.

Memory unit 502 stores application data 507 associated with active application programs. Responsive to an encapsulate system call, as described herein, the user may select a capture area on the on-screen GUI 506 (using a cursor directing device, for instance) to create a new OS object 508 based on the screen segments captured and the application data associated with the application programs included in the screen segments. The OS object 508 contains all information required to recreate the data and the images and the active GUI elements of the capture area, including, for instance, their relative position within the capture area, definitions of the elements and metadata indicating functionality of how to implement any GUI elements contained therein and applications required to implement the functionality and/or OS calls or API calls required to implement the functionality.

Once the OS object 508 has been created, the OS object 508 may be packaged using system pointers, or packaged into a file on the file system 504 so that the captured area can be transferred to a new location. In general, Object Packaging 509 saves the captured object into a screen capsule file format, and the captured object is then saved locally or transferred to the remote computer system. According to some embodiments, when the OS object is saved as part of a file on local file system 504, or when the OS object is to be sent from the capturing computer system to remote computer system 505, the information required by the OS object will be repackaged as a file so that any platform can read the OS object 508 and automatically identify what is contained in the object, and how to extract and use the information and how the display the information so that it resembles the original capture area 506.

Embodiments of the present invention are thus described. Using the various embodiments of the present invention, information can be better shared between computer systems and active GUI elements of a captured screen region can be transferred to another system or another application program and re-instantiated and used, as in the original display. While the present invention has been described in particular embodiments, it should be appreciated that the present invention should not be construed as limited by such embodiments, but rather construed according to the following claims.

What is claimed is:

1. A method of encapsulating an interactive on-screen graphical user interface, said method comprising:
   initiating a screen capture of information displayed on the interactive on-screen graphical user interface rendered on a display screen of a computer system;
   receiving a first user input and a second user input at the computer system, wherein an on-screen position of the first user input defines a beginning of a geometric area of the interactive on-screen graphical user interface, wherein an on-screen position of the second user input defines an end of the geometric area of the interactive on-screen graphical user interface, and wherein the geometric area defines a capture portion of the interactive on-screen graphical user interface to be encapsulated; and
   responsive to an operating system level encapsulation system call, creating and encapsulating a system object in a system memory of the computer system based on said capture portion, wherein the system object comprises instructions to render the interactive on-screen graphical user interface which is associated with a first application program rendered in the capture portion, wherein the first application program executes the instructions to render said interactive on-screen graphical user interface, and wherein further the system object comprises software and elements required for reproducing the capture portion on a remote computer system or within a second application program of said computer system, wherein creating the system object creates a new OS class that automatically inherits properties from the first application program, and wherein the system object comprises visual information describing an appearance of the capture portion, at least one sub-object comprising information describing a user program in the capture portion, a localization flag used to indicate that a captured object is to remain on the computer system and not be transferred to the remote computer system, and a function for re-saving the system object to a new file or object.

2. The method as recited in claim 1, further comprising, responsive to the initiating a screen capture, modifying an on-screen cursor to indicate that the capture portion of the interactive on-screen graphical user interface to be encapsulated is to be defined.

3. The method as recited in claim 1, further comprising:
   packaging the system object in the system memory using a pointer; and
   opening the system object to reproduce the capture portion of the interactive on-screen graphical user interface of the first application program within a different interactive on-screen graphical user interface of the computer system.

4. The method as recited in claim 1, further comprising packaging the system object into a file on a local file system of the computer system and wherein the software and elements comprise: data; images; definition metadata of on-screen elements; positional metadata of on-screen elements; and metadata of functionality of interactive on-screen graphical user interface elements.

5. The method as recited in claim 4, further comprising:
   transferring the file from the local file system to a remote computer system; and
   reproducing the capture portion of the interactive on-screen graphical user interface of the first application program on an on-screen display of the remote computer system.

6. The method as recited in claim 1, wherein the screen capture is invoked responsive to a gesture made using a touch-sensitive display or responsive to a keystroke.

7. The method as recited in claim 1, wherein the software and elements comprise: data; images; definition metadata of on-screen elements; positional metadata of on-screen elements; metadata of functionality of interactive on-screen graphical user interface elements and an identification of said first application program.

8. The method as recited in claim 1, wherein the first user input is received responsive to clicking a button of a user input device, and the second user input is received responsive to releasing the button of the user input device.

9. A method of defining and encapsulating an interactive on-screen graphical user interface for reproduction thereof on a remote computer system, said method comprising:
   initiating a screen capture of the interactive on-screen graphical user interface on a first computer system;
   defining a geometric area of the interactive on-screen graphical user interface using an input device, said geometric area being a capture area and wherein said interactive on-screen graphical user interface is related to a plurality of application programs;
   responsive to an operating system level encapsulation system call, encapsulating said capture area to create a system object for the geometric area of the interactive on-screen graphical user interface, wherein the system object comprises a first sub-object comprising instructions to render an interactive on-screen graphical user interface of a first application program and a second sub-object comprising instructions to render an interactive on-screen graphical user interface of a second application program, wherein the first application program executes said instructions to render said interactive on-screen graphical user interface of the first application program, wherein the second application program executes said instructions to render said interactive on-screen graphical user interface of the second application program, and wherein at least part of the interactive on-screen graphical user interface of the first application program and at least part of the interactive on-screen graphical user interface of the second application program are displayed within the geometric area of the interactive on-screen graphical user interface; and
   transferring the system object from the first computer system for receipt by the remote computer system; and
   wherein the system object is operable to be opened on the remote computer system to reproduce the geometric area of the interactive on-screen graphical user interface on a display of the remote computer system, wherein creating the system object creates a new OS class that automatically inherits properties from the first application program, and wherein the system object comprises visual information describing an appearance of the capture area, at least one sub-object comprising information describing a user program in the capture portion, a localization flag used to indicate that a captured object is to remain on the capturing computer system and not be transferred to a remote computer system, and a function for re-saving the system object to a new file or object.

10. The method as recited in claim 9, wherein a reproduced geometric area on the display of the remote computer system implements, on the remote computer system, an interactive on-screen graphical user interface of the first application program and an interactive on-screen graphical user interface of the second application program.

11. The method as recited in claim 10, further comprising activating one or more graphical user elements of the geometric area of the interactive on-screen graphical user interface reproduced on the display of the remote computer system.

12. The method as recited in claim 10, wherein the one or more graphical user elements of the geometric area reproduced on the display of the remote computer system is activated by clicking thereon.

13. The method as recited in claim 9, wherein opening the system object on the remote computer system causes the interactive on-screen graphical user interface of the first application program and the interactive on-screen graphical user interface of the second application program to be reproduced on a display of the remote computer system.

14. The method as recited in claim 9, further comprising packaging the system object using a pointer in a system memory of the first computer system.

15. The method as recited in claim 9, further comprising packaging the system object into a file on a local file system of the first computer system and wherein said first and second sub-objects respectively comprise: data; images; definition metadata of on-screen elements; positional metadata of on-screen elements; metadata of functionality of on-screen graphical user interface elements and an identification of said first and second application programs.

16. The method as recited in claim 9, wherein the initiating a screen capture is invoked responsive to a gesture made using a cursor directing device or responsive to a keystroke of the first computer system.

17. The method as recited in claim 9, wherein said first and second sub-objects respectively comprise: data; images; definition metadata of on-screen elements; positional metadata of on-screen elements; metadata of functionality of on-screen graphical user interface elements and an identification of said first and second application programs.

18. An apparatus for encapsulating an interactive on-screen graphical user interface for reproduction on a remote computer system, said apparatus comprising:
   a display screen that displays the interactive on-screen graphical user interface;
   a general purpose processor; and
   a system memory,
   wherein the general purpose processor is operable to execute instructions to:
   initiate a screen capture of the interactive on-screen graphical user interface;
   identify a geometric area of the interactive on-screen graphical user interface;
   responsive to an operating system level encapsulation system call, create system object for the geometric area of the interactive on-screen graphical user interface, wherein the object comprises a first sub-object comprising instructions to render an interactive on-screen graphical user interface of a first application program and a second sub-object comprising instructions to render an interactive on-screen graphical user interface of a second application program, wherein the first application program executes said instructions to render said interactive on-screen graphical user interface of the first application program, wherein the second application program executes said instructions to render said interactive on-screen graphical user interface of the second application program, and wherein at least part of the interactive on-screen graphical user interface of the first application program and at least part of the interactive on-screen graphical user interface of the second application program are displayed within the geometric area of the interactive on-screen graphical user interface; and
   store the system object within said system memory wherein the system object is operable to be opened on a remote computer system to reproduce the geometric area of the interactive on-screen graphical user interface, wherein creating the system object creates a new OS class that automatically inherits properties from the first application program, and wherein the system object comprises visual information describing an appearance of the geometric area of the interactive on-screen graphical user interface, at least one sub-object comprising information describing a user program in the capture portion, a localization flag used to indicate that a captured object is to remain on the capturing computer system and not be transferred to a remote computer system, and a function for re-saving the system object to a new file or object.

19. The apparatus as recited in claim 18, wherein the general purpose processor is operable to package the object using at least one of a pointer in the system memory and a local file and wherein further the interactive on-screen graphical user interface reproduced on the remote computer system comprises the interactive on-screen graphical user interface of the first application program and the interactive on-screen graphical user interface of the second application program on a display of the remote computer system.

* * * * *